Aug. 9, 1949.    J. J. SMART ET AL    2,478,643
POWER LOADER
Filed March 4, 1946    2 Sheets-Sheet 1
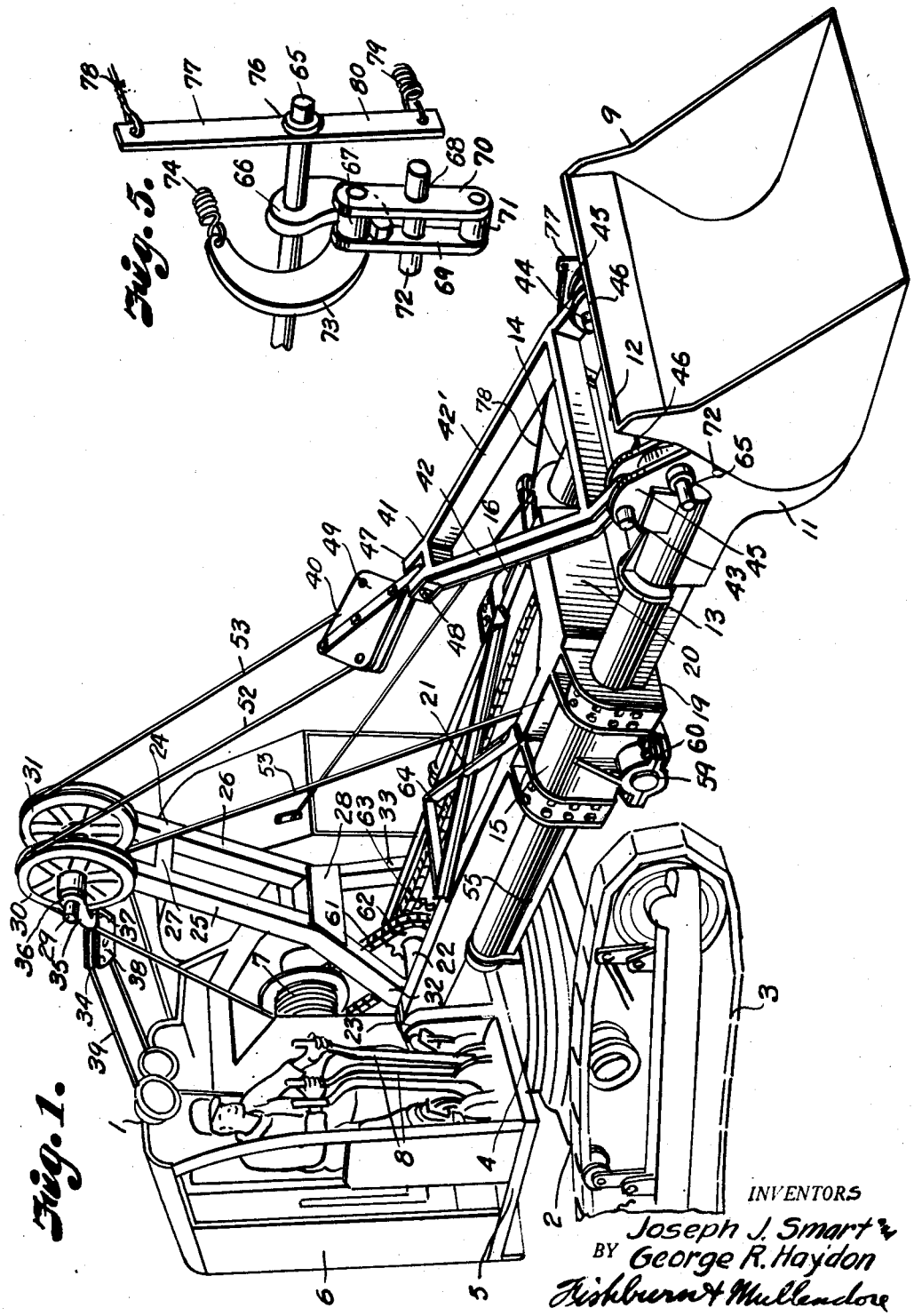
INVENTORS
Joseph J. Smart &
BY George R. Haydon
Fishburn & Mullendore
ATTORNEYS

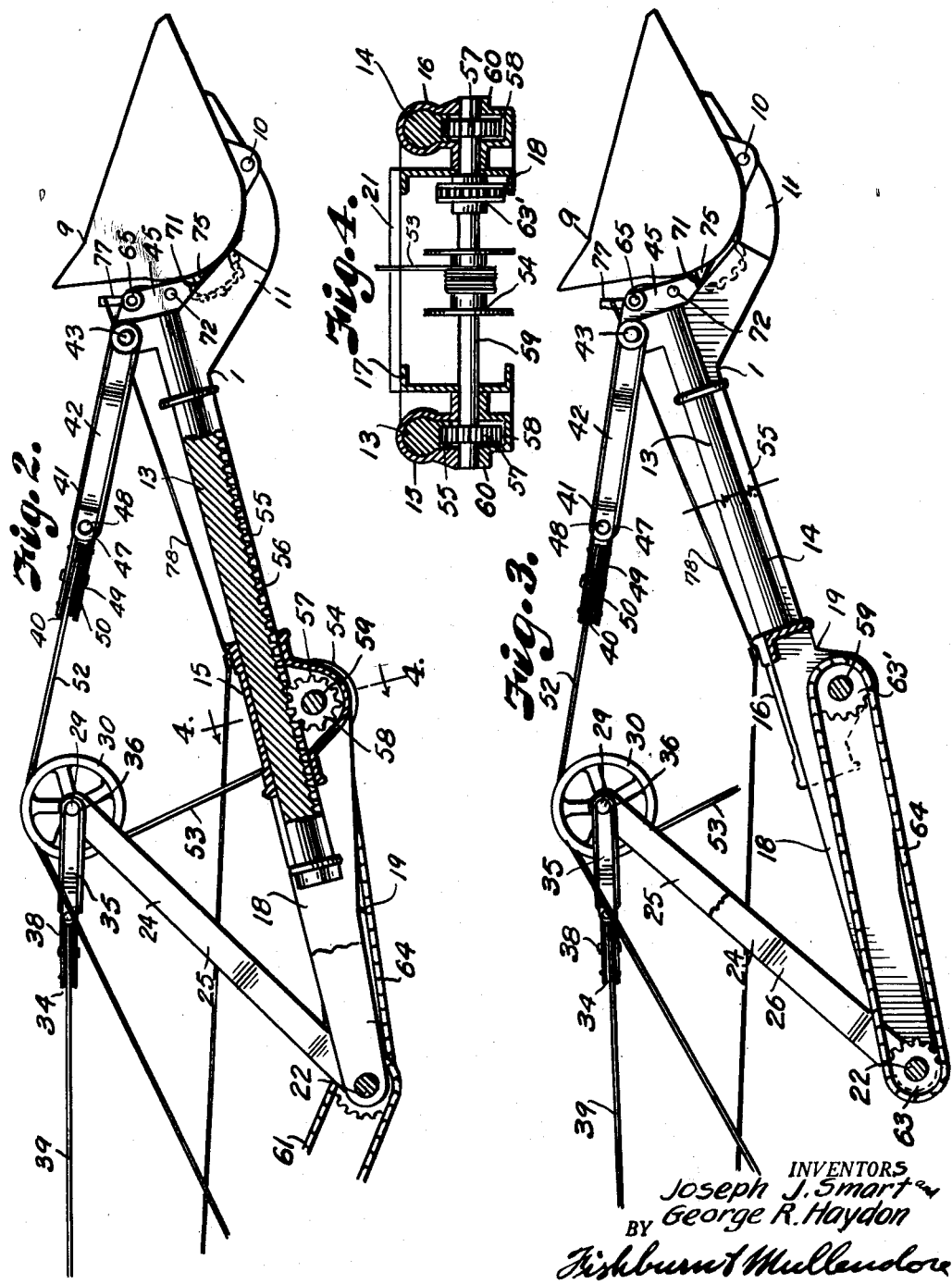

Patented Aug. 9, 1949

2,478,643

UNITED STATES PATENT OFFICE 2,478,643

POWER LOADER

Joseph J. Smart, Mission, Kans., and George B. Haydon, Kansas City, Mo.

Application March 4, 1946, Serial No. 651,701

4 Claims. (Cl. 214—132)

This invention relates to power loaders such as used in loading materials from a pile into a truck. Loaders of this character usually comprise a tractor having a bucket pivotally mounted on the front thereof for raising and lowering movement. To fill the bucket, the shovel is lowered and the tractor is moved into the pile of material. The shovel is then raised and the tractor is backed away from the pile and is moved into position for dumping the material into the truck. Such equipment is relatively light and easily maneuvered but is slow in operation because of the small capacity of such equipment. This difficulty could be overcome in part by providing shovels of larger capacity, but such shovels also require larger and more powerful tractor equipment, and such equipment does not have the desired mobility.

It is, therefore, a principal object of the present invention to provide a loader equipped with a bucket of large capacity and which is readily movable to and from the tractor and swung from side to side and thereby reducing the necessity of maneuvering the tractor to bring the shovel into its various positions.

Other objects of the invention are to provide a bucket mounted on a telescoping boom which is adapted to be projected and retracted under power of the tractor as when loading the shovel and moving the shovel to dumping position; to provide for support of the telescoping portions of the boom; to provide a boom structure of bucket mounting thereon whereby the loads act substantially coaxial of the boom sticks or arms; to provide a simple tackle arrangement for raising and lowering the boom; and to provide automatically for adjustment of the tackle responsive to projection and retraction of the telescoping boom.

Another object of the invention is to provide for lateral stability of the shovel by a double stick boom.

A further object of the invention is to provide a simple latch for supporting the bucket of the shovel in fixed position on the boom and for pivotally releasing the bucket as when dumping a load.

In accomplishing these and other objects of the invention hereinafter pointed out, we have provided improved structure, the preferred form of which is illustrated in the accompanying drawings wherein:

Fig. 1 is a perspective view of a power loader constructed in accordance with the present invention.

Fig. 2 is a side elevational view of the bucket, boom and tackle mechanism, parts being shown in section to illustrate telescoping mounting of one of the boom arms or sticks and the rack and pinion gearing for effecting retraction and projection thereof.

Fig. 3 is a similar view but showing the section taken at a different point to illustrate the driving connections between the pinion countershaft and the power shaft about the axis of which the boom is pivoted.

Fig. 4 is a cross section on the line 4—4 of Fig. 2, particularly illustrating the reel for winding up and paying out the tackle when the boom is extended and retracted.

Fig. 5 is a detail perspective view of the bucket latching mechanism.

Referring more in detail to the drawings:

1 designates a power loader constructed in accordance with the present invention and which is particularly adapted for loading material from a pile into a truck or other conveyance. The loader includes a mobile support such as a tractor 2 which is shown as being of the track laying type as indicated by the endless tracks 3 and which are adapted to be driven by a motor in the manner of conventional tractors of this type. Mounted on the tractor is a turntable 4 carrying a platform 5 which mounts a housing 6 containing a motor or power unit, and turning and hoisting mechanisms including a winding drum 7. The operating controls as indicated by the levers 8 are located for the convenience of the operator, the operator being located on the platform and in a position to observe manipulation of the bucket 9 of the machine. The bucket 9 is pivotally mounted as indicated at 10 on brackets 11 that are interconnected by a cross frame 12. The cross frame is carried on laterally spaced boom arms or sticks 13 and 14 which arms are slidably mounted in sleeve-like bearing brackets 15 and 16 carried by the side members 17 and 18 of a boom section 19. The side members 17 and 18 are connected at their forward ends by a transverse member 20 and by bracing 21. The rear ends of the side members are pivotally journalled on a transverse power shaft 22 having the ends thereof mounted in suitable bearing brackets 23 carried on the platform 5 in front of the winding drum 7 and in central alignment with the turntable 4. Also pivotally mounted on the shaft 22 is a gantry 24 including side members 25 and 26 interconnected by cross members 27 and 28 to form a rigid structure for supporting a crown pulley shaft 29 that mounts crown pulleys 30 and 31. The lower ends 32 and 33 of the side members of the gantry converge outwardly and have bearing portions pivotally mounted on the power shaft 22.

The gantry is supported in upright position by a tackle mechanism 34 including a yoke 35 having bearings 36 engaging projecting ends of the crown pulley shaft 29. The yoke also includes a cross bar 37 and connected thereto is a tackle block 38 for reeving a cable 39 that is connected with a winding device (not shown) which is contained within the housing 6 for raising the gantry to an operating position and for lowering the gantry so that the mechanism may be readily transported under wires or the like as when moving the machine from one loading location to another or when moving the machine through a mine entrance.

The free end of the telescoping boom is suspended by a tackle mechanism 40 which includes a yoke member 41 having side arms 42 and 41 pivotally connected with pins 43 and 44 that are carried by laterally spaced plates 45 and 46 forming a part of the bucket carrying brackets. The arms 42 and 41 converge rearwardly and terminate in spaced ears 47 carrying a cross pin 48 for pivotally anchoring a tackle block 49 which carries a sheave 50. The sheave 50 has a diameter conforming to the spacing between the crown pulleys 30 and 31 so that when the lifting cable 51 is reeved therearound the runs 52 and 53 thereof align with the grooves of the crown pulleys 30 and 31. The run 52 after passing over the crown pulley 30 is wound on the winding drum 7 and is adapted to be actuated by the power upon actuation of the drum. The run 53 of the cable passes over the other crown pulley 31 and is anchored to and wound upon a compensating reel 54, later described.

It is obvious that with the structure thus far described the boom consists of a fixed section pivotally mounted on the power shaft and a telescoping section carrying the shovel with the bucket end of the boom suspended from the crown pulleys by the tackle 39.

In order to project and retract the movable or telescoping section of the boom, the boom sticks are provided on the underside thereof with racks 55 having teeth 56 meshing with the teeth 57 of pinion gears 58, which gears are mounted on a countershaft 59 that is journalled in bearings 60 depending from the guide housings 15 and 16 as best shown in Fig. 1. The power shaft 22 is operated from the power of the tractor through a chain 61 operating over a sprocket 62 fixed to the shaft 22. Fixed to the countershaft 59 in alignment with a sprocket 63 on the power shaft 22 is a sprocket 63' and operating over the sprockets is an endless chain belt 64. It is thus obvious that when the shaft 22 is driven under control of the operator in one direction the chain 64 would drive the sprockets 63' and countershaft to cause the pinion gears to effect projection of the boom sticks and when the shaft is rotated in the opposite direction under control of the operator, the boom sticks are retracted relative to the fixed section of the boom, and the shovel is moved to and from the tractor on which it is mounted.

It is obvious that telescope movement of the boom would seriously interfere with the tackle 53 unless means is provided for lengthening and shortening the tackle in co-ordination with movement of the boom sticks relative to the fixed section of the boom. I, therefore, provide the compensating reel 54 previously mentioned and which is fixed on the countershaft 59 intermediate the side members 17 and 18 as best shown in Fig. 4 and on which the end of the run 53 of the cable is wound so that when the countershaft is rotated in a direction to effect retraction of the boom sticks the reel rotates and winds the cable thereon to automatically maintain elevational position of the boom while the boom is being adjusted for length. Likewise, when the countershaft is reversed to project the boom, the reel is rotated to correspondingly pay off the cable so that the tackle is at all times adjusted to compensate for the length of the boom and in all positions thereof.

In order to retain the bucket in fixed position on its pivotal mounting as when loading the bucket and carrying the bucket from loading to dumping position, the plates 45 and 56 journal a transverse shaft 65 to which is attached intermediate each pair of plates 45 and 46 a hook-shaped arm 66 engaging rollers 67 on latch members 68. The latch members 68 include laterally spaced side bars 69 and 70 carrying the rollers 67 at their upper ends and latch rollers 71 at their lower ends. The arms are pivotally mounted intermediate the roller on pins 72 that are journalled in the pairs of plates 45 and 46. Fixed to the upper ends of the arms are upwardly and rearwardly curved arms 73 extending over the shaft 65 and connected with a fixed part of the frame by a coil spring 74 whereby the lower rollers 71 of the latch members are kept in position for engaging keeper lugs 75 carried on the back of the bucket in alignment with the shovel arms.

In order to disengage the latch members in opposition to the spring 74, the shaft carries a lever 76 at one end thereof to provide an upwardly extending arm 77 connected by a cable 78 adapted to be manipulated by the operator against action of a spring 79 connected with the lower arm 80 of the lever as best shown in Fig. 5. When the arm is moved retractively responsive to pull on the cable 78, the hook arms engage the rollers 67 and move them forwardly so that the latches rock on the pivot pins 72 and move the rollers 71 out of engagement with the keeper lugs on the bucket. The bucket is then free to pivot on the arms 11 to effect dumping thereof. Upon dumping of the load the bucket returns to its original position responsive to gravity as the tipping movement thereof is limited by chains 73 connecting the bucket with the cross member 12 of the boom.

In using the machine constructed and assembled as described, it is moved under its own power to the site of operation, the machine being located in position so that the shovel can be pushed into a pile of material to be loaded and so that the boom can be swung from the pile to dumping position over the bed of a truck to be filled. The gantry 24 is raised from the position shown in Figs. 2 and 3 by operating the tackle 34. The telescoping boom is then lowered onto the pile by rotating the winding drum 7 (Fig. 1) to pay out the tackle cable over the crown pulley 30 to lengthen the runs thereof. The telescoping section of the boom is then operated to project the bucket into the pile of material. This is effected by operating the power shaft in a clockwise direction (Fig. 2) to move the chain 64 and sprocket 63' on the countershaft 59, thereby rotating the countershaft in a clockwise direction so that the pinions 58 thereon move the racks outwardly to project the boom sticks and push the bucket into the material. During projection of the telescoping section of the boom, the connection of the tackle with the yoke 40 imparts a pull on the runs 52 and 53 of the lifting cable but due to rotation of the countershaft 5 in a clockwise direction, the cable wound on the compensating reel 54 is payed therefrom in correspondence with movement of the telescoping section of the boom. Thus, projection of the boom is in no way interfered with by the tackle.

When the bucket is filled the boom is retracted by reversing direction of the power shaft. Simultaneously, the winding drum may be operated to wind the lifting cable over the crown pulley 30 to raise the boom and lift the bucket from the pile. During retraction of the boom, the cable is wound on the compensating reel to support the position of the shovel. If desired, the loaded bucket may be withdrawn from the pile, after which the boom may be raised so that it can be swung to position in line with the truck by operating the turntable 4 of the tractor. The boom is then projected to carry the bucket over the bed of the truck by operating the power shaft in clockwise direction as previously described. During this movement, the lifting cable is payed from the compensating reel so as to maintain the elevation of the shovel. When the bucket is in position over the bed of the truck, it is dumped by releasing the latches from engagement with the keepers on the bucket. This is effected by pulling on the cable 78 to rock the lever 76 against action of the spring 79. This effects rocking of the shaft 65 so that the hook-shaped arms 66 thereon push the upper ends of the latches forwardly to move the rollers 71 out of latching engagement with the keeper lug 75 on the bucket. The bucket then hinges under weight of the load so that the material is dumped into the truck bed.

After dumping, the bucket returns to its original position and the lugs thereon are automatically engaged by the latches due to the springs 74. It is thus obvious that a truck or the like can be loaded from a pile of material without shifting of the tractor.

From the foregoing it is obvious that we have provided a power loader of large capacity for facilitating loading or movement of material from one position to another. It is also obvious that the telescoping boom eliminates the necessity of maneuvering the tractor except for positioning of the machine from which the shovel is readily manipulated.

Another important advantage is that the bucket is mounted so that the loading thrusts and the load when raised act coaxially on the boom sticks. Also, any tendency for the boom sections to sag at the telescoping connection is resisted through support thereof by means of the cable 53.

What we claim and desire to secure by Letters Patent is:

1. A machine of the character described including a support, a boom having a fixed section and a telescoping section, means pivoting the fixed section for swinging movement on the support about a horizontal axis, a gantry on the support, crown pulleys carried by the gantry, a winding drum on the support, a rack on the movable section, a pinion rotatably mounted on the fixed section and engaging said rack, a power shaft having coaxial support with the pivotal axis of said boom, a driving connection between the power shaft and said pinion, a reel having driving connection with the pinion, a sheave connected with the movable section, and a cable reeved over said sheave and having a run extending over one of the crown pulleys and connected with the winding drum and having a run extending over the other crown pulley and connected with said reel for taking up and paying out cable responsive to extension and retraction of the movable section of said boom.

2. A machine of the character described including a support, a boom having a fixed section and a telescoping section, means pivoting the fixed section for swinging movement on the support about a horizontal axis, a gantry on the support, crown pulleys carried by the gantry, a winding drum on the support, a rack on the movable section, a pinion rotatably mounted on the fixed section and engaging said rack, a power shaft having coaxial support with the pivotal axis of said boom, a sprocket on the power shaft, a sprocket connected with the pinion, a chain for operating over said sprockets, a reel having driving connection with the pinion, a sheave connected with the movable section, and a cable reeved over said sheave and having a run extending over one of the crown pulleys and connected with the winding drum and having a run extending over the other crown pulley and connected with said reel for taking up and paying out cable responsive to extension and retraction of the movable section of said boom.

3. A machine of the character described including a mobile support, a boom including a fixed section, sleeve-like bearings on opposite sides of the fixed section, a telescoping section having arms slidable in said sleeve-like bearings, means pivoting the fixed section for swinging movement on the mobile support about a horizontal axis, a cross member connecting outer ends of said arms, shovel carrying brackets on the ends of said arms, a shovel supported on said brackets, a gantry on the support, crown pulleys carried by the gantry, a winding drum on the mobile support, racks on the arms, a countershaft carried transversely of the sleeve-like bearings, pinions rotatably mounted on said countershaft and engaging said racks, a power shaft having coaxial support with the pivotal axis of said boom, a driving connection between the power shaft and said countershaft, a reel on the countershaft, a sheave connected with the cross member, and a cable reeved over said sheave and having a run extending over one of the crown pulleys and connected with the winding drum and having a run extending over the other crown pulley and connected with said reel for taking up and paying out cable responsive to extension and retraction of the movable sections of said boom.

4. A machine of the character described including a support, a boom on the support and having a fixed section and a movable section for varying length of the boom, a gantry on the support, a winding drum on the support, a rack on the movable section, a pinion rotatably mounted on the fixed section and engaging said rack, a power shaft, a driving connection between the power shaft and said pinion, a reel having driving connection with the pinion, a sheave connected with the movable section, and a cable reeved over said sheave and having a run extending over the gantry and connected with the winding drum and having a run extending over the gantry and connected with said reel for taking up and paying out cable responsive to extension and retraction of the movable section of the boom.

JOSEPH J. SMART.
GEORGE R. HAYDON.

REFERENCES CITED

The following references are of record in the file of this patent:

UNITED STATES PATENTS

| Number | Name | Date |
|---|---|---|
| 388,910 | Osgood | Sept. 4, 1888 |
| 534,510 | King | Feb. 19, 1895 |
| 1,143,619 | Fairbanks | June 22, 1915 |
| 1,937,016 | Gibby | Nov. 28, 1933 |
| 1,992,543 | Rasmussen et al. | Feb. 26, 1935 |
| 2,082,018 | McClain | June 1, 1937 |
| 2,140,988 | Dukelow et al. | Dec. 20, 1938 |
| 2,339,700 | Huston | Jan. 18, 1944 |
| 2,420,991 | White | May 20, 1947 |

FOREIGN PATENTS

| Number | Country | Date |
|---|---|---|
| 696,060 | France | Oct. 7, 1930 |